United States Patent
Ardö

(10) Patent No.: US 11,670,074 B2
(45) Date of Patent: Jun. 6, 2023

(54) METHOD AND IMAGE-PROCESSING DEVICE FOR DETECTING FOREIGN OBJECTS ON A TRANSPARENT PROTECTIVE COVER OF A VIDEO CAMERA

(71) Applicant: Axis AB, Lund (SE)

(72) Inventor: Björn Ardö, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/679,114

(22) Filed: Feb. 24, 2022

(65) Prior Publication Data
US 2022/0335706 A1 Oct. 20, 2022

(30) Foreign Application Priority Data
Apr. 19, 2021 (EP) .................................... 21169059

(51) Int. Cl.
*G06V 10/60* (2022.01)
*G06T 7/571* (2017.01)
(Continued)

(52) U.S. Cl.
CPC ............ *G06V 10/60* (2022.01); *G06T 3/0056* (2013.01); *G06T 7/571* (2017.01); *H04N 23/52* (2023.01); *H04N 23/695* (2023.01); *H04N 23/80* (2023.01); *H04N 23/959* (2023.01); *G06T 2207/10144* (2013.01); *G06T 2207/10148* (2013.01); *G06T 2207/30232* (2013.01); *G06T 2207/30244* (2013.01)

(58) Field of Classification Search
None
See application file for complete search history.

(56) References Cited

U.S. PATENT DOCUMENTS

2010/0074554 A1* 3/2010 Gyotoku .......... H04N 5/232933
382/275
2011/0080494 A1* 4/2011 Mori .................... H04N 5/2171
348/222.1

OTHER PUBLICATIONS

"Depth of field", Wikipedia, Available Online at: https://web.archive.org/web/20210414151835/https://en.wikipedia.org/wiki/Depth_of_field, Retrieved from Internet on Sep. 22, 2021, 11 pages.

(Continued)

*Primary Examiner* — James M Hannett
(74) *Attorney, Agent, or Firm* — Xsensus LLP

(57) ABSTRACT

A method for determining whether or not a transparent protective cover of a video camera comprising a lens-based optical imaging system is partly covered by a foreign object is disclosed. The method comprises:
obtaining (402) a first captured image frame captured by the video camera with a first depth of field;
obtaining (404) a second captured image frame captured by the video camera with a second depth of field which differs from the first depth of field; and
determining (406) whether or not the protective cover is partly covered by the foreign object by analysing whether or not the first and second captured image frames are affected by presence of the foreign object on the protective cover such that the difference between the first depth of field and the second depth of field results in a difference in a luminance pattern of corresponding pixels of a first image frame and a second image frame. The first image frame is based on the first captured image frame and the second image frame is based on the second captured image frame.

21 Claims, 9 Drawing Sheets

(51) Int. Cl.
*G06T 3/00* (2006.01)
*H04N 23/52* (2023.01)
*H04N 23/80* (2023.01)
*H04N 23/695* (2023.01)
*H04N 23/959* (2023.01)

(56) References Cited

OTHER PUBLICATIONS

"Distortion (optics)", Wikipedia, Available Online at: The Wayback Machine—https://web.archive.org/web/20210403063307 /https://en.wikipedia.org/wiki/Distortion_(optics), Retrieved from Internet on Sep. 23, 2021, 5 pages.

Hamzeh et al., "A Review of Detection and Removal of Raindrops in Automotive Vision Systems", Journal of Imaging, Mar. 10, 2021, vol. 10, No. 3, 42 pages.

\* cited by examiner

METHOD AND IMAGE-PROCESSING DEVICE FOR DETECTING FOREIGN OBJECTS ON A TRANSPARENT PROTECTIVE COVER OF A VIDEO CAMERA

CROSS-REFERENCE TO RELATED APPLICATION

This application claims priority to European Patent Application No. 21169059.9 filed on Apr. 19, 2021, the entire disclosure of which is incorporated by reference herein.

TECHNICAL FIELD

The embodiments herein relate to a method and an image-processing device for determining whether or not a transparent protective cover of a video camera is partly covered by a foreign object on the transparent protective cover. In other words, embodiments herein relate to a method and an image-processing device for detecting a foreign object adhering to the protective cover of the video camera. A corresponding computer program and a computer program carrier are also disclosed.

BACKGROUND

Surveillance of the public using imaging, in particular video imaging, is common in many areas around the world. Areas that may need monitoring are for example banks, stores, and other areas where security is needed, such as schools and government facilities. Other areas that may need monitoring are processing, manufacturing and logistics applications where video surveillance is primarily used to monitor processes.

In order to protect a video camera from for example dirt and vandalism many surveillance cameras are equipped with a protective housing. However, monitoring with the video camera may still be disturbed by dirt or small objects on the protective cover. The dirt or objects may lower the video quality by distortion of the image or even make it more difficult to detect and/or track persons or objects which should be detected and/or tracked by the video camera.

To overcome this problem the protective cover may be cleaned when necessary. However, there is a problem of detecting if there is dirt or objects on the protective cover which requires cleaning, be that from sabotage or naturally occurring.

SUMMARY

An object of embodiments herein may thus be to obviate some of the problems mentioned above, or at least reduce the impact of them. Specifically, an object may be to detect a foreign object adhering to a transparent protective cover of a video camera.

According to an aspect, the object is achieved by a method, performed by an image-processing device, for determining whether or not a transparent protective cover of a video camera comprising a lens-based optical imaging system is partly covered by a foreign object on the protective cover.

The method comprises obtaining a first captured image frame captured by the video camera with a first depth of field.

The method further comprises obtaining a second captured image frame captured by the video camera with a second depth of field which differs from the first depth of field.

The method further comprises determining whether or not the protective cover is partly covered by the foreign object. For example, determining whether or not the protective cover is partly covered by the foreign object may comprise detecting that the protective cover is partly covered by the foreign object.

Determining whether or not the protective cover is partly covered by the foreign object is performed by analysing whether or not the first and second captured image frames are affected by presence of the foreign object on the protective cover such that the difference between the first depth of field and the second depth of field results in a difference in a luminance pattern of corresponding pixels of a first image frame and a second image frame. The first image frame is based on the first captured image frame and the second image frame is based on the second captured image frame.

At least one of the captured image frames may be geometrically transformed and compensated for a difference in exposure value in order to perform the analysis.

According to another aspect, the object is achieved by an image-processing device configured to perform the above method.

According to further aspects, the object is achieved by a computer program and a computer program carrier corresponding to the aspects above.

By analysing the difference in the luminance pattern of corresponding pixels of the first image frame and the second image frame captured with a difference in depths of field determination of whether or not the protective cover is partly covered by the foreign object is improved since the images used for the determination are anyway captured such that no extra images nor image stream is necessary. Thus, embodiments herein provide the possibility to detect foreign objects on the protective cover without disturbing the normal operation of the video camera.

BRIEF DESCRIPTION OF THE DRAWINGS

In the figures, features that appear in some embodiments are indicated by dashed lines.

The various aspects of embodiments disclosed herein, including particular features and advantages thereof, will be readily understood from the following detailed description and the accompanying drawings, in which.

DETAILED DESCRIPTION

As mentioned above, there may be a problem of detecting if there is dirt or objects on the protective cover of a video camera which requires cleaning. Embodiments herein are directed to detecting objects on the protective cover.

Figure 1:
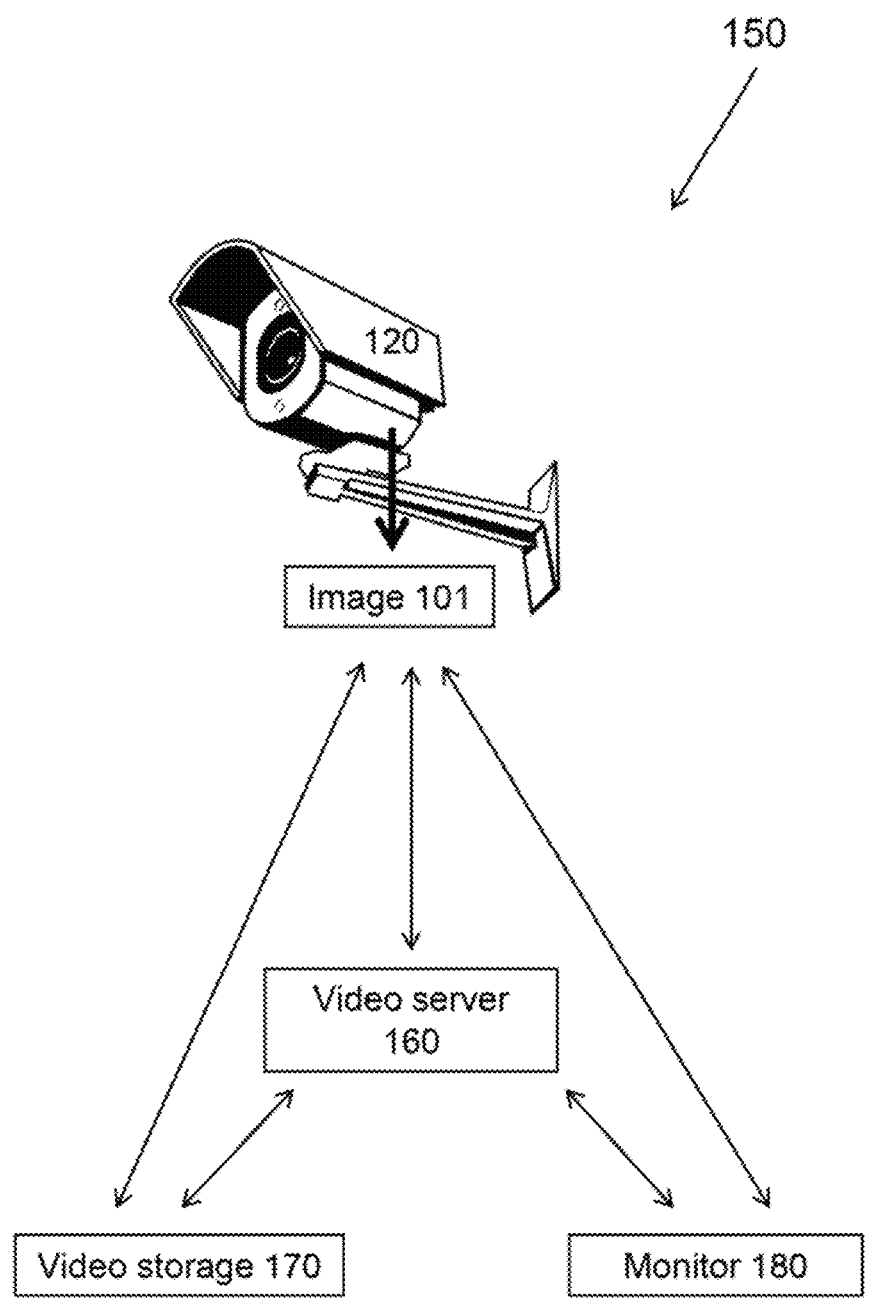
FIG. 1 illustrates exemplifying embodiments of an image-capturing device and a video network system.

Embodiments herein may be implemented in one or more image-processing devices. The one or more image-processing devices may for example be an image-capturing device, such as a video camera, or a video server or a combination of these. The video camera may be a digital video camera. FIG. 1 depicts an image-processing device in the form of a video camera 120, such as a surveillance camera or a monitoring camera, such as a pan tilt and zoom (PTZ) video camera. Thus, in some embodiments herein the image-processing device is the video camera 120.

FIG. 1 further depicts an exemplifying video network system 150 in which embodiments herein may be implemented. The video network system 150 may include the video camera 120 which can capture and perform image processing on a digital video image 101. A video server 160 in FIG. 1 may obtain the digital video image 101, for example from the video camera 120 over a network or the like, which is indicated in FIG. 1 with the double-pointing arrows.

A video server is a computer-based device that is dedicated to delivering video. Video servers are used in a number of applications, and often have additional functions and capabilities that address the needs of particular applications. For example, video servers used in security, surveillance and inspection applications typically are designed to capture video from one or more video cameras and deliver the video via a computer network. In video production and broadcast applications, a video server may have the ability to record and play recorded video, and to deliver many video streams simultaneously. Today, many video server functions may be built-in in the video camera 120.

Thus, in FIG. 1, the video server 160 is connected over the video network system 150, to the video camera 120. The video server 160 may further be connected to a video storage 170 for storage of video images, and/or connected to a monitor 180 for display of video images. In some embodiments the video camera 120 is connected directly with the video storage 170 and/or the monitor 180, as indicated by the direct arrows between these devices in FIG. 1. In some other embodiments the video camera 120 is connected to the video storage 170 and/or the monitor 180 via the video server 160, as indicated by the arrows between the video server 160 and the other devices.

Figure 2A:
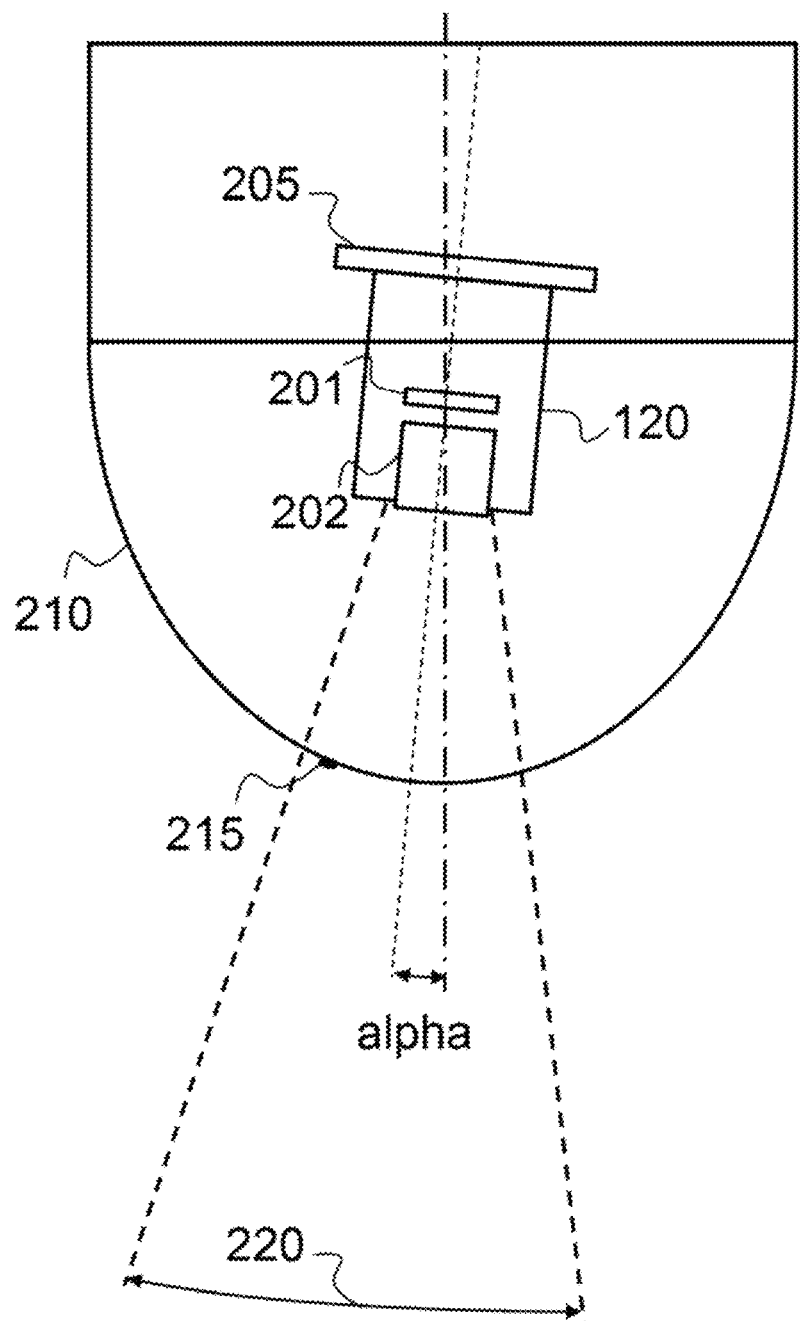
FIG. 2a is a schematic overview illustrating exemplifying embodiments of an image-capturing device.

FIG. 2*a* is a schematic overview illustrating exemplifying embodiments of the video camera 120.

The video camera 120 comprises an image sensor 201 onto which a lens-based optical imaging system 202 of the video camera 120 images a scene. The lens-based optical imaging system 202 may also be referred to as a lens system. In some embodiments the lens-based optical imaging system 202 is a zoom system. That is, the focal length of the optical imaging system 202 may be adjustable. The zoom may be used in order to more easily use the captured images for different purposes. For example, a zoomed-out image may be used to discover and/or track objects or persons, while a zoomed-in image may be used to show details and identify objects or persons.

The optical imaging system 202 of the video camera 120 may comprise an adjustable aperture. The adjustable aperture may control light intensity at the image sensor 201 of the video camera 120.

Figure 2B:
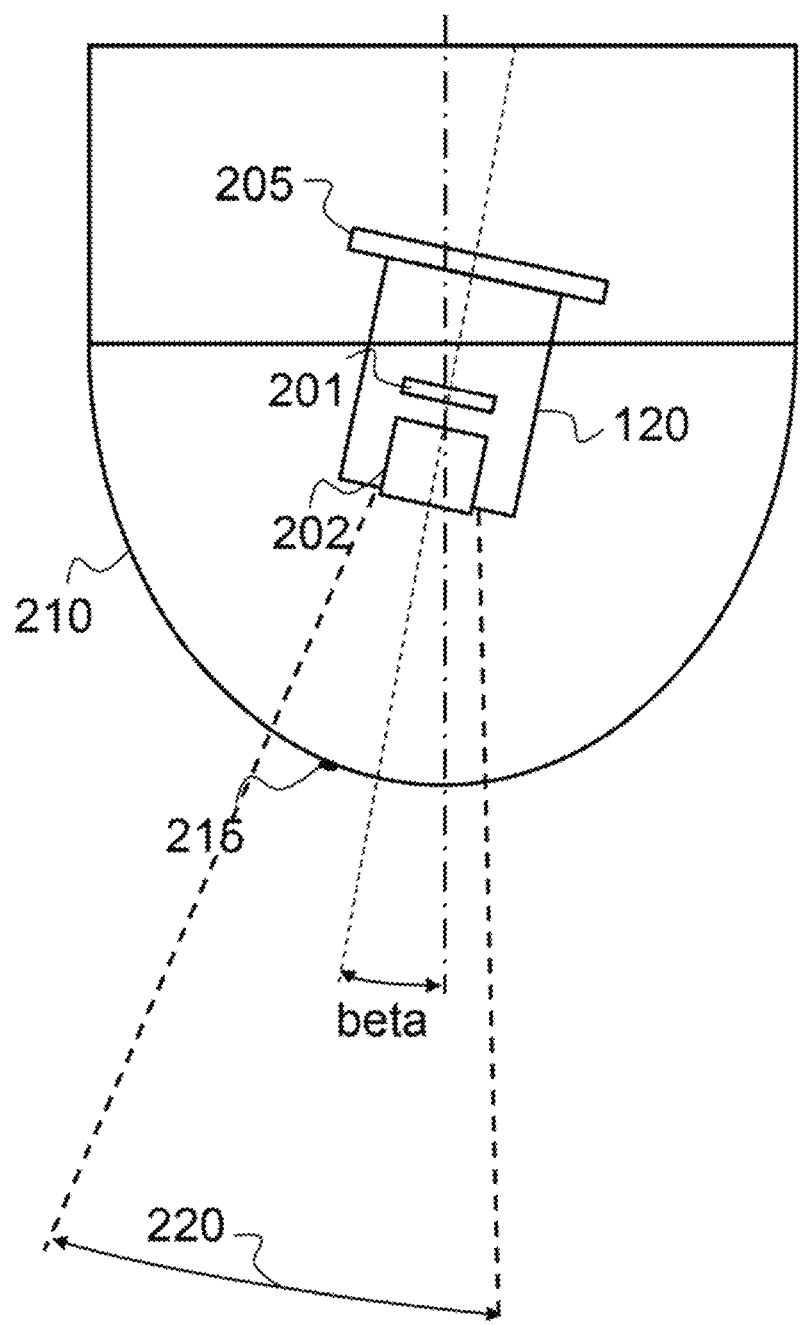
FIG. 2b is a schematic overview illustrating exemplifying embodiments of an image-capturing device, FIG. 3 a schematic overview illustrating exemplifying embodiments of an image-capturing device.

The video camera 120 may be arranged on a motorised pan and tilt arrangement 205. The motorised pan and tilt arrangement 205 may adjust the orientation of the video camera 120 by adjusting pan and tilt angles such that different scenes may be captured. In FIG. 2*a* the video camera 120 is arranged with an angle alpha against an axis of a protective housing. In FIG. 2*b* the video camera 120 is arranged with an angle beta against the axis of the protective housing. Adjustment of the orientation of the video camera 120 may be used in order to scan different sub-areas of a larger area and to track objects or persons.

The video camera 120 is arranged in the protective housing. The protective housing comprises a transparent protective cover 210. The protective housing covers the video camera 120 such that no parts of the video camera 120 are arranged outside the protective housing. Specifically, the entire optical imaging system 202 is covered by the transparent protective cover 210.

FIGS. 2*a* and 2*b* further illustrate a field of view 220 of the optical imaging system 202

In order to better understand embodiments herein a digital video image processing system will first be described.

Figure 3:
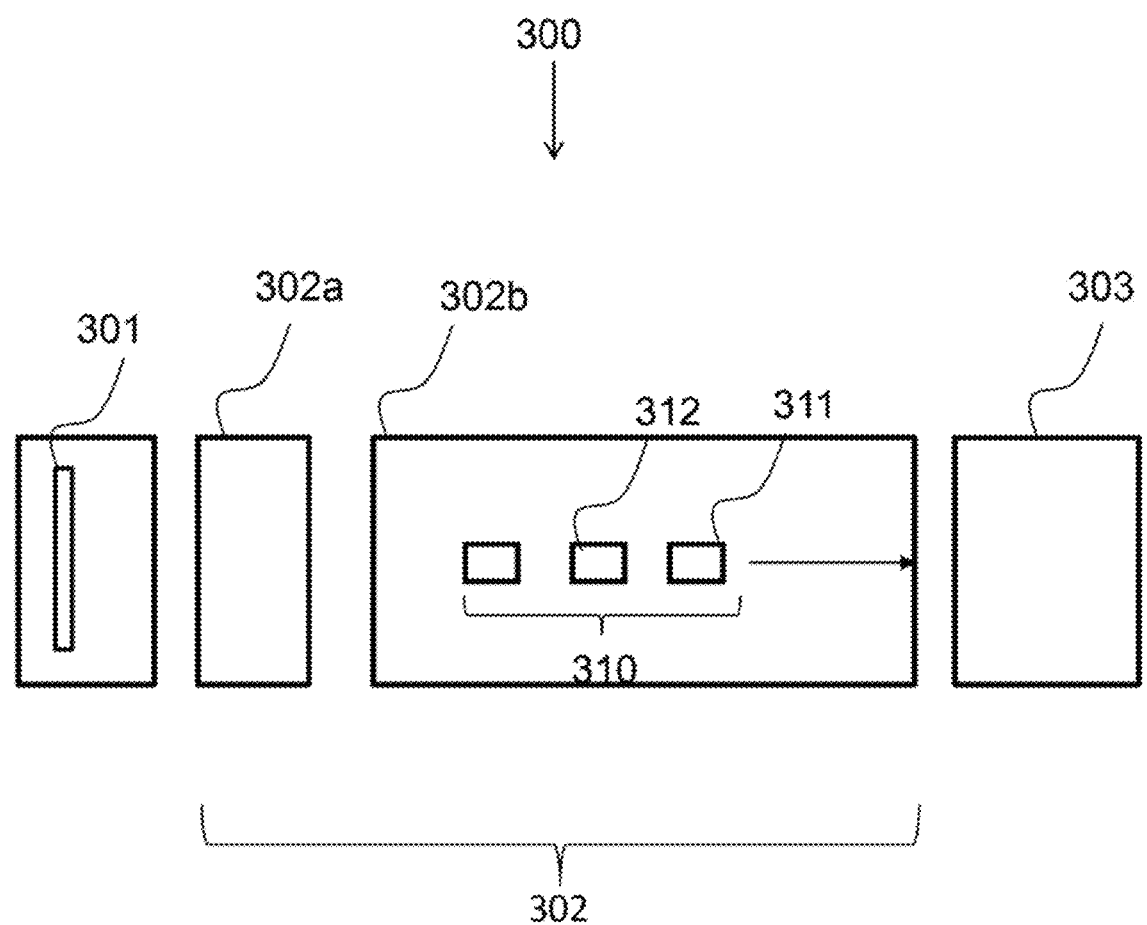

FIG. 3*a* is a schematic view of a digital video image processing system 300, in this case of a digital video camera, such as the video camera 120. The digital video image-processing system 300 images a scene on an image sensor 301 with the lens-based optical imaging system 202. In other words, the digital video image-processing system 300 captures the scene with the image sensor 301. The image sensor 301 may be provided with a Bayer filter, such that different pixels will receive radiation of a particular wavelength region, in a known pattern. Typically, each pixel of the captured image is represented by one or more values representing the intensity of the captured light within a certain wavelength band. These values are usually referred to as colour components, or colour channels. The term "image" may refer to an image frame or video frame including information originating from an image sensor that has captured the image.

The video camera 120 may apply different gain to different exposures. For example, a first exposure with a first light intensity per area at the image sensor 301 may have a different gain than a second exposure with a second light intensity per area at the image sensor 301. By changing the gain, it is possible to adjust the apparent brightness of the second exposure to match the brightness of the first exposure even though the image sensor 301 received different light intensity per area.

In general, gain may be described as a means of increasing the ISO of the video camera 120 and apparent sensitivity to light. In more technical terms, gain in a digital imaging device may be said to represent the relationship between the number of electrons acquired on the image sensor 301 and the analog-to-digital units (ADUs) that are generated, representing the image signal. Increasing the gain amplifies the signal by increasing the ratio of ADUs to electrons acquired on the image sensor 301. The result is that increasing gain increases the apparent brightness of an image at a given exposure.

After having read the signal of individual sensor pixels of the image sensor 301, different image processing actions may be performed by an image processing pipeline 302. The image processing pipeline 302 may comprise an image processing part 302a and a video post-processing part 302b.

Typically for video processing the images are comprised in a stream of images, FIG. 3a illustrates a first video stream 310 from the image sensor 301. The first image stream 310 may comprise multiple captured image frames, such as a first captured image frame 311 and a second captured image frame 312.

Image processing may comprise demosaicing, color correction, noise filtering (for eliminating spatial and/or temporal noise), distortion correction (for eliminating effects of, e.g., barrel distortion), global and/or local tone mapping (e.g., enabling imaging of scenes containing a wide range of intensities), transformation (e.g., rectification and rotation), flat-field correction (e.g., for removal of the effects of vignetting), application of overlays (e.g., privacy masks, explanatory text), etc. The image processing pipeline 302 may also be associated with an analytics engine performing object detection, recognition, alarms, etc.

The image processing part 302a may e.g. perform image stabilization, apply noise filtering, distortion correction, global and/or local tone mapping, transformation, and flat-field correction. The video post-processing part 302b may for example crop parts of an image, apply overlays, and comprise the analytics engine.

Following the image processing pipeline 302 the image may be forwarded to an encoder 303, wherein the information in the image frames is coded according to an encoding protocol, such as H.264, and forwarded to for example a receiving client, exemplified here with the monitor 180, to the video server 160, the storage 170, etc.

Figure 4A:
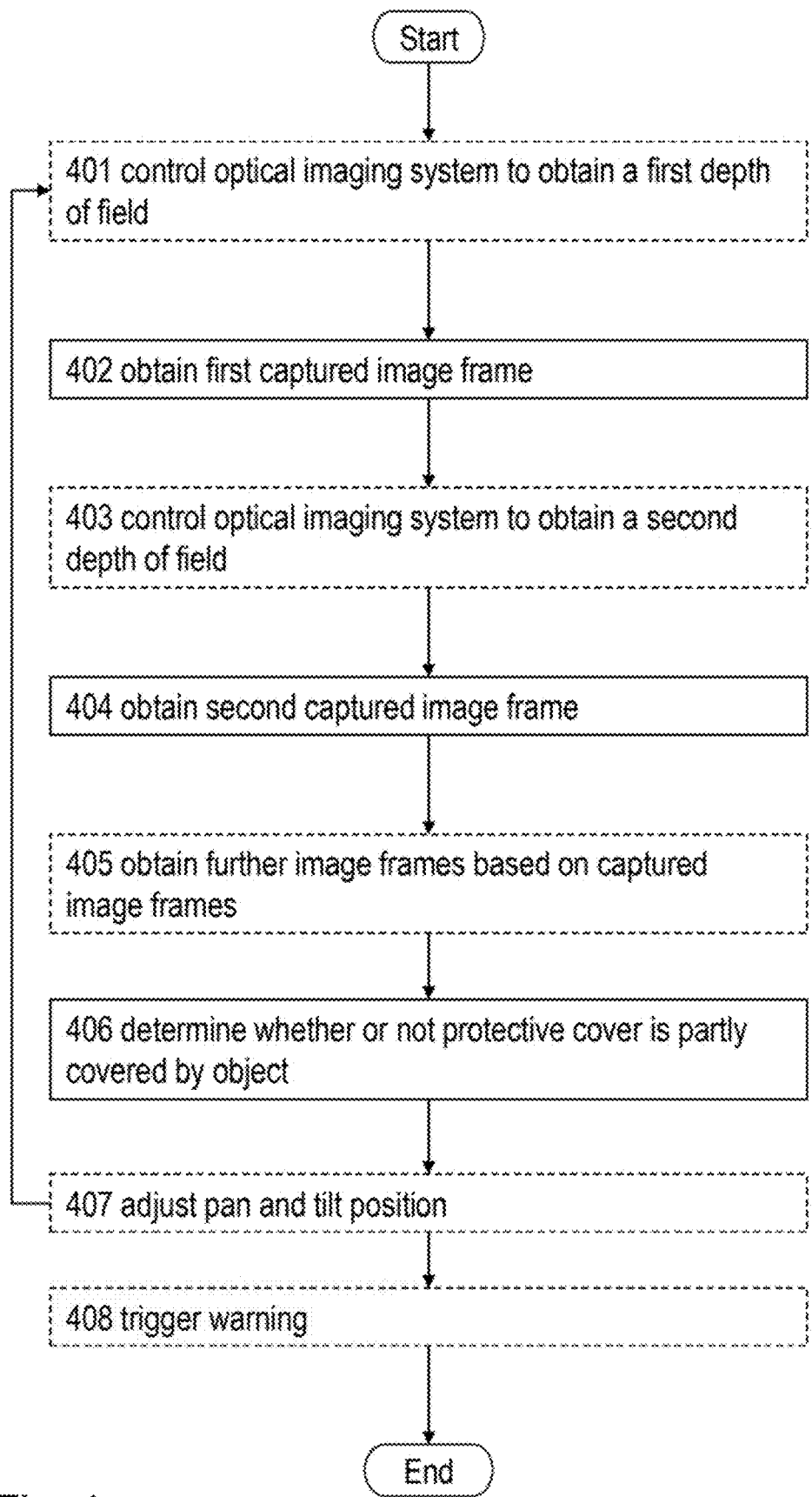
FIG. 4a is a flowchart illustrating embodiments of a method in an image-processing device.

Exemplifying methods according to embodiments herein will now be described with reference to a flowchart of FIG. 4, and with further reference to FIGS. 1, 2a-2b and 3.

The flowchart of FIG. 4 illustrates methods, performed by an image-processing device, such as the video camera 120 and/or the video server 160, for determining whether or not the transparent protective cover 210 of the video camera 120, comprising the lens-based optical imaging system 202, is partly covered by a foreign object 215 on the protective cover 210.

In other words, the methods are for detecting the foreign object 215 adhering to the transparent protective cover 210 of the video camera 120. The foreign object 215 may be smaller than the protective cover 210.

The methods may be implemented in an image-processing device, in particular the video camera 120 of FIG. 1. However, the methods may also be implemented in the video server 160. Embodiments herein may also be implemented in several image-processing devices. For example, in some embodiments herein the method for detecting objects on the protective cover of the video camera 120 is performed in a distributed manner in both the video camera 120, and one or more further image-processing devices, such as the video server 160. The one or more further image-processing devices may also be comprised in a Video Management System (VMS), or a computer cloud or a VMS implemented in the computer cloud. More specifically, some parts of the method, such as controlling different image-capturing parameters and capturing the image frames may be performed by the video camera 120, while other parts like analysing images may be performed by the one or more further image-processing devices.

One or more of the following actions presented in FIG. 4 may be performed in the following exemplifying order. In other examples, the order may differ from what is described below.

Embodiments herein comprise analysing a pair of image frames from the video camera 120 taken with different depths of field and determining whether or not the transparent protective cover 210 of the video camera 120 is partly covered by the foreign object 215 on the protective cover 210. In other words, the analysis may result in a detection of the foreign object.

Embodiments herein take advantage of the fact that changing the depth of field influences how the object 215 is imaged on the image sensor 201, 301. A larger depth of field will sharpen the image of the object 215 which will change a distribution of light intensity that hits the image sensor 201, 301 on pixels that correspond to the image of the object 215 compared to when the object 215 is imaged with a shallower depth of field. The light that hits the image sensor 201, 301 induces pixel intensity signals which may be stored as the captured image frames 311, 312. For example, the pixel intensity signals may correspond to linear-light quantities, such as linear RGB components. Such linear-light quantities are directly proportional to physical radiance. Another linear-light quantity is relative luminance, sometimes denoted Y. It is directly proportional to physical radiance weighted by the spectral sensitivity of human vision. Luminance involves light having wavelengths in the range of about 400 nm to 700 nm. Luminance may also be computed as a properly weighted sum of linear-light red, green, and blue tristimulus components according to the principles and standards of the Commission Internationale de l'Éclairage (CIE).

Using linear components may be an advantage since the pixel intensity signals may need to be adjusted by for example multiplication in order to correct for differences in exposure values. In embodiments herein For RGB color spaces that use the ITU-R BT.709 primaries (or sRGB, which defines the same primaries), relative luminance may be calculated from linear RGB components by first converting gamma-compressed RGB values to linear RGB, and then by the following formula:

$Y=0.2126R+0.7152G+0.0722B.$

In embodiments herein the expression luminance is used to denote pixel intensity signals of a respective image frame. Specifically, luminance may correspond to the relative luminance of the pixels of the image frame. Further, in embodiments herein a luminance pattern denotes a pattern of the pixel intensity signals, such as a pattern of the relative luminance of the respective pixels of the respective image frame. The luminance pattern may also correspond to a pattern of a gradient or a derivative of the relative luminance of the pixels.

Thus, a decrease in luminance due to the object 215 may be concentrated to fewer pixels with an increased depth of field. For example, the first captured image frame 311 may be captured with a first depth of field which is lower than a second depth of field of the second captured image frame 312. The luminance of the first captured image frame 311 may be affected by the object 215 in for example 50×50 pixels. For example, the luminance compared to surrounding pixels may be lowered by a few percent. The luminance of the second captured image frame 312 may be affected by the object 215 in 30×30 pixels and the luminance variation compared to surrounding pixels may be more lowered than for the first captured image frame 311. Thus, by comparing the luminance patterns of the two captured image frames 311, 312 it is possible to detect the object 215. However, since the change of depth of field may change the overall luminance on the image sensor 201, 301 it may be important to compensate for such overall luminance changes due to the change in depth of field. This may for example be the case if the depth of field is changed by the adjustable aperture.

In some embodiments herein the depth of field is changed by adjusting the focal length of the lens-based optical imaging system 202. Then at least one of the captured images may need to be geometrically transformed before it is possible to compare the images.

When a detection of the foreign object 215 occurs the image-processing device 120, 160 may trigger a warning indicating the attachment of the foreign object 215 on the protective cover 210, which in turn may trigger an appropriate cleaning of the protective cover 210.

The method allows detection of the foreign object 215 on the protective cover 210 without disturbing the ordinary stream of image frames 310 since the method obtains information from image frames in the normal stream of images. Specifically, if the focal length of the lens-based optical imaging system 202 is adjustable, e.g., a zoom-lens, then the change in depth of field occurs naturally when changing the focal length. Thus, there is no need to capture images specifically for the purpose of detecting foreign objects on the protective cover 210.

Action 401

In some embodiments herein the video camera 120 may control the optical imaging system 202 to obtain a first depth of field. Thus, the image-processing device 120, 180 may control the optical imaging system 202 to obtain the first depth of field.

The first depth of field may for example be obtained by controlling the focal length of the lens-based optical imaging system 202. Thus, the first depth of field may correspond to a first focal length or a first zoom position of the lens-based optical imaging system 202. A large focal length corresponds to a shallow depth of field compared to a small focal length given that the focus distance is the same.

In some other embodiments herein the first depth of field is obtained by controlling the adjustable aperture by the video camera 120. Thus, the first depth of field may correspond to a first aperture opening of the lens-based optical imaging system 202. Thus, in some embodiments wherein the optical imaging system 202 of the video camera 120 comprises the adjustable aperture the first depth of field is obtained by the first aperture opening of the optical imaging system 202. For example, the first aperture opening may be a full-aperture opening, i.e., corresponding to the largest aperture opening such as f-number 2.8. The full-aperture opening may correspond to a shallow depth of field. In another example, the first aperture opening corresponds to a larger depth of field. For example, an f-number of 11 may correspond to the larger depth of field. A large aperture opening corresponds to a shallow depth of field. However, since sharpness is reduced at high f-numbers due to diffraction the larger depth of field may be obtained at an f-number that is chosen also based on requirements on sharpness.

In some embodiments the video camera 120 controls both the focal length and the aperture opening to obtain the first depth of field. Thus, the first depth of field may correspond to a first setting of the focal length and the aperture opening.

Action 402

The image-processing device 120, 160 obtains the first captured image frame 311 captured by the video camera 120 with a first depth of field.

For example, the video camera 120 may obtain the first captured image frame by capturing it. The video server 160 may obtain the first captured image frame by receiving it from the video camera 120.

Thus, in some embodiments herein the local length of the optical imaging system 202 is adjustable and the first captured image frame 311 is captured with a first focal length of the optical imaging system 202 to obtain the first depth of field.

Since the second captured image frame 312 may be captured with a different exposure value than the first captured image frame 311 the exposure values or a ratio of the exposure values may be saved in order to compensate for the difference. Thus, the first captured image frame 311 may be captured with a first exposure value. The exposure values may be defined by the exposure time, the aperture opening and a gain of the image sensor 201, 301.

Action 403

The video camera 120 may control the optical imaging system 202 to obtain the second depth of field which differs from the first depth of field.

The video camera 120 may control the optical imaging system 202 to obtain the second depth of field by controlling the focal length and/or the aperture opening of the optical imaging system 202.

For example, in case the first aperture opening was a full-aperture opening the second aperture opening may be a smaller aperture opening, such as the smallest aperture opening. In another example, the first aperture opening is the largest aperture opening, then the second aperture opening may be the smallest aperture opening.

Action 404

The image-processing device 120, 160 obtains the second captured image frame 312 captured by the video camera 120 with a second depth of field which differs from the first depth of field.

At least partly a same part of the protective cover 210 may be captured by the first and second captured image frames 311, 312 in order to have overlapping images of the foreign object 215. In other words, the second captured image frame 312 may comprise an image of at least partly the same part of the protective cover as the first captured image frame. Preferably, a static scene is captured such that the luminance pattern is unaffected by dynamic objects, such as cars or bumble bees in the scene.

When the depth of field is adjusted by adjusting the focal length of the optical imaging system 202 then the second captured image frame 312 is captured with a second focal length of the optical imaging system 202 to obtain the second depth of field.

In some embodiments the second depth of field is obtained by a second aperture opening of the optical imaging system 202.

The second captured image frame 312 may be captured with a second exposure value which may differ from the first exposure value. In other words, the first exposure value may differ from the second exposure value.

Action 405

In embodiments herein the image-processing device 120, 160 obtains further image frames 311', 312' based on the first and second captured image frames 311, 312. The further image frames 311', 312' may also be referred to as adjusted or transformed image frames 311', 312'. The further image frames 311', 312' are used for comparing luminance patterns between two images captured with different depths of field since the original captured image frames may be difficult to compare directly due to differences in optical parameters, such as the focal length and/or the aperture opening which in turn may produce differences in exposure values and fields of view. Further, the focal length and the aperture opening may also affect the image frames in other ways which may need to be compensated for, such as vignetting of the image frames. The further image frames 311', 312' may be compensated for vignetting before comparing the image frames with each other.

In order to obtain the further image frames 311', 312' copies of the first and second captured image frames 311, 312 may be created, e.g., in the normal image processing pipeline 302. The further image frames 311'. 312 may then be created as (local) transforms of the captured image frames 311, 312 and may be discarded once the comparison of the luminance patterns is done.

Thus, in some embodiments herein, some sort of adjustment of the captured image frames 311, 312 is needed before the image frames may be compared. In an example illustrated by FIG. 4b, a first image frame 311' is generated as a copy of the first captured image frame 311, while a second image frame 312' is generated as a copy of the second captured image frame 312. As mentioned above, a difference in exposure values may be compensated by adjusting the luminance values of the first image frame 311' with respect to the luminance values of the first captured image frame 311. Each luminance value is associated with a respective pixel of the image frames. In an alternative embodiment, the difference in exposure values is compensated by adjusting the luminance values of the second image frame 312' with respect to the luminance values of the second captured image frame 312. It is also possible to adjust the luminance values of both the first image frame 311' and the second image frame 312'.

For example, a ratio of the second exposure value to the first exposure value may be used to adjust the luminance values of one of the first or second image frames 311', 312'. If a linear pixel intensity signal is used, such as the relative luminance, then the same value, such as the ratio of the second exposure value to the first exposure value, may be used to adjust all pixel intensity values.

Compensating for the difference in exposure value may be performed after compensating for vignetting.

In some embodiments wherein the focal length of the optical imaging system 202 is adjustable, at least one of the captured image frames 311, 312 may need to be geometrically transformed before the luminance patterns can be compared in order to compensate for a difference in fields of view due to the different focal lengths.

Thus, in some embodiments herein, either the first image frame 311' is obtained by geometrically transforming the first captured image frame 311, or the second image frame 312' is obtained by geometrically transforming the second captured image frame 312. In other words, at least one of the first image frame 311' and the second image frame 312' may be obtained by geometrically transforming the respective first and second captured image frame 311, 312.

For example, if the captured image frames 311, 312 have different amounts of optical aberrations, like barrel distortion, these may need to be compensated for by geometrically transforming one or both of the captured image frames 311, 312.

To compensate for different focal lengths a scaling of the captured image frames 311, 312 may be performed. The scaling may be performed in combination with a cropping of the captured image frame with the shortest focal length, i.e., the zoomed-out image frame. For example, an area of the zoomed-out image frame may be cropped. What is left of the zoomed-out image frame is then upscaled to the same size as the zoomed-in image frame. Alternatively, the zoomed-in image frame may be down-scaled to the size of the cropped zoomed-out image frame.

Action 406

The image-processing device 120, 160 determines whether or not the protective cover 210 is partly covered by the foreign object 215 by analysing whether or not the first and second captured image frames 311, 312 are affected by presence of the foreign object 215 on the protective cover 210 such that the difference between the first depth of field and the second depth of field results in a difference in the luminance pattern of corresponding pixels 411', 421' of the first image frame 311' and the second image frame 312'. The first image frame 311' is based on the first captured image frame 311 and the second image frame 312' is based on the second captured image frame 312.

Figure 4B:
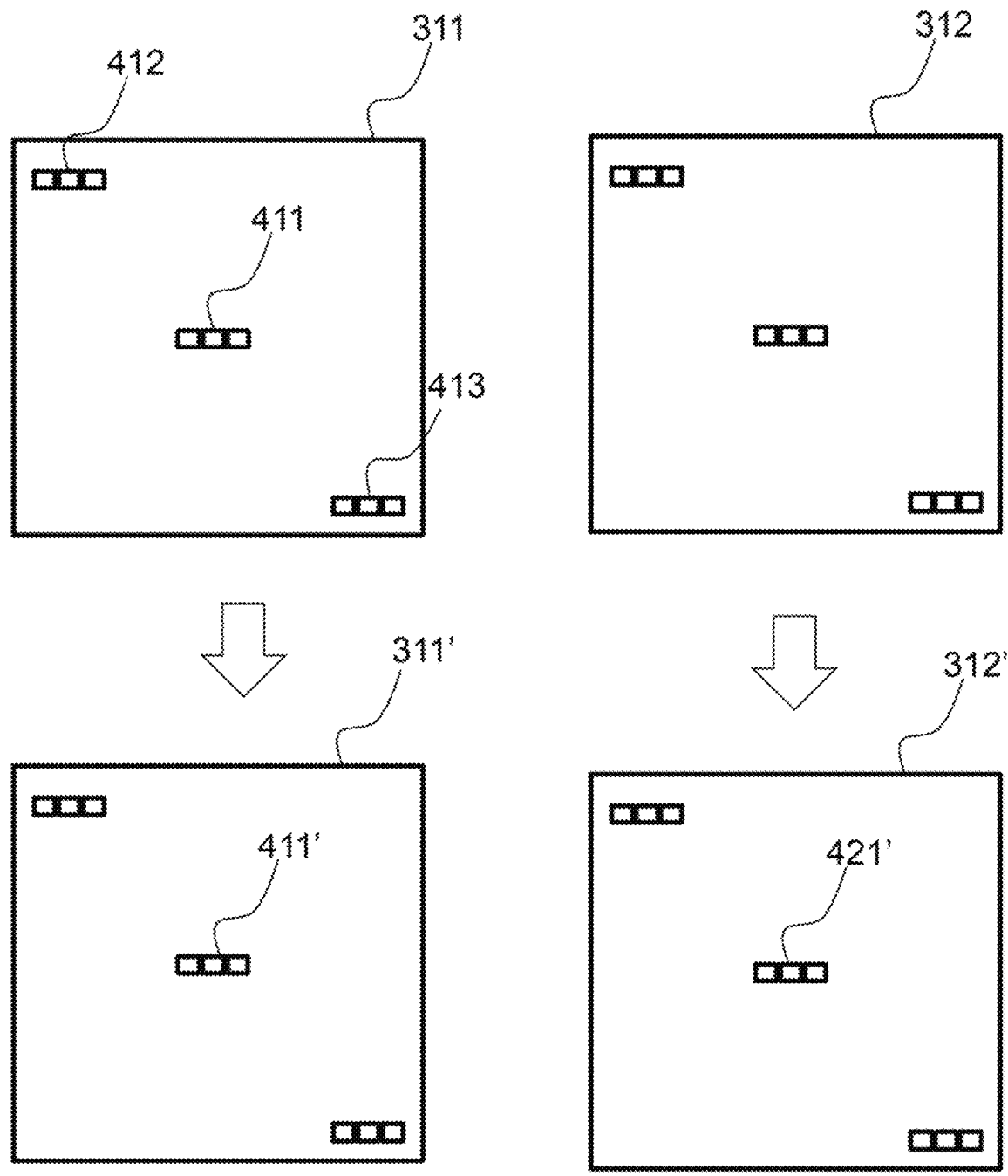
FIG. 4b illustrates exemplifying embodiments herein.

FIG. 4b illustrates a first corresponding pixel 411' of the first image frame 311' and a first corresponding pixel 421' of the second image frame 312'. There may be multiple corresponding pixels in the respective first and second image frames 311', 312'.

How to obtain the first image frame 311' from the first captured image frame 311 and the second image frame 312' from the second captured image frame 312 was described above in relation to action 405. For example, at least one of the captured image frames 311, 312 may be geometrically transformed and compensated for the difference in exposure values before action 406.

Thus, this action may comprise comparing the luminance of pixels of the two derived image frames 311', 312'. Determining whether or not the protective cover 210 is partly covered by the foreign object 215 may comprise detecting the foreign object at the protective cover 210. Thus, the image-processing device 120, 160 may detect that the foreign object adheres to the protective cover 210 by detecting a difference in the luminance pattern between one or more pixels of the first image frame 311', which is based on the first captured image frame 311 and corresponding one or more pixels of the second image frame 312', which is based on the second captured image frame 312.

As mentioned above when describing action 405, the first image frame 311' may be calculated from the first captured image frame 311. Likewise, the second image frame 312' may be calculated from the second captured image frame 312. Such calculations may for example comprise adjusting luminance values. The luminance values may be adjusted based on the ratio of the second exposure value to the first exposure value. The calculations may further comprise geometrically transforming the captured images 311, 312.

After adjusting at least one of the captured image frames due to differences in exposure and/or focal length a clean protective cover 210 should result in a zero difference of the luminance of corresponding pixels. Thus, it may be determined that the protective cover 210 is partly covered by the foreign object 215 if the difference in the luminance pattern is above a threshold. In other words, the foreign object may be detected if the difference in the luminance pattern is above the threshold. The threshold may be predeterminable. Specifically, the image-processing device 120, 180 may determine that the protective cover 210 is partly covered by the foreign object 215 if a larger depth of field results in a lower luminance of the luminance pattern than a shallower depth of field. The luminance of the luminance pattern may be a total luminance or a mean luminance of the luminance pattern, for example of the corresponding pixels. Combinations of the total luminance and the mean luminance may also be used for different corresponding pixels. In some other embodiments, the luminance of the luminance pattern may correspond to respective luminance values of respective corresponding pixels. For example, in some embodiments each respective pixel luminance value may need to differ by the threshold value in order to determine that the protective cover 210 is covered by the foreign object 215.

Figure 4C:
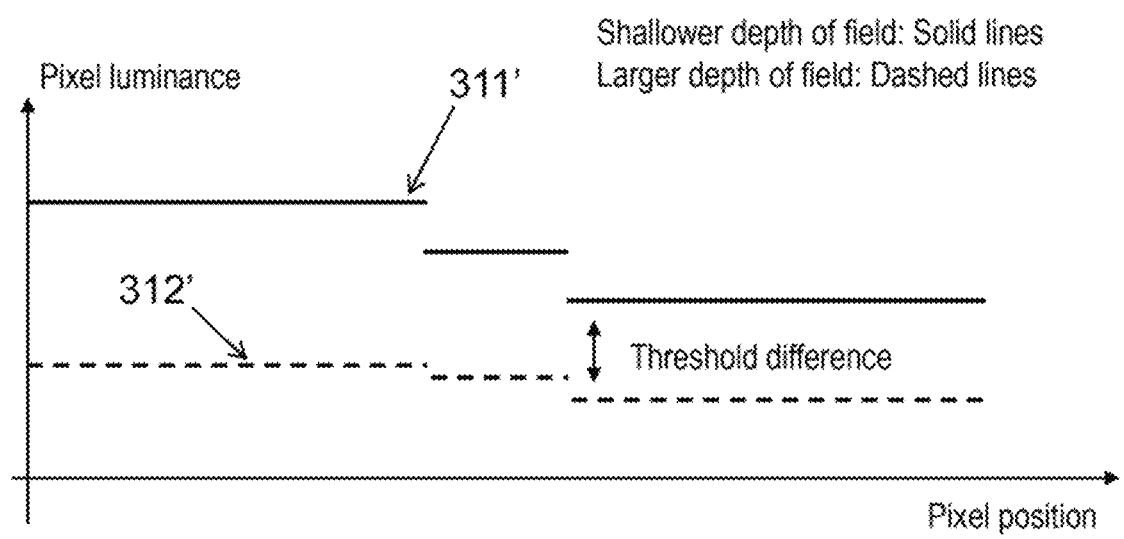
FIG. 4c illustrates further exemplifying embodiments herein.

In other words, the foreign object 215 may be detected if the larger depth of field results in the lower luminance of the corresponding pixels 411'. 421 than the shallower depth of field. For example, if the luminance of the image frame based on the captured image frame with the larger depth of field is lower by the threshold difference than the luminance of the image frame based on the captured image frame with the shallower depth of field, then the image-processing device 120, 180 may determine that the protective cover 210 is partly covered by the foreign object 215. This is illustrated in FIG. 4c where the luminance of some corresponding pixels of first image frame 311' is compared to the luminance of some corresponding pixels of second image frame 312'. In FIG. 4c the first image frame 311' is based on the shallower depth of field than the second image frame 312'. That is, the first captured image frame 311 was captured with the shallower depth of field than the second captured image frame 312.

In some embodiments herein the difference in the luminance pattern of corresponding pixels refers to a threshold number of pixels for which a difference in luminance is greater than a predeterminable threshold. For example, if the low depth of field image frame comprises ten corresponding pixels for which the luminance is greater than the luminance of the ten corresponding pixels of the large depth of field image frame then this may correspond to the difference of the luminance pattern. However, if there are only five corresponding pixels for which the luminance is significantly different then the method may determine that the difference in the luminance pattern is below the threshold and thus non-significant for detecting the foreign object 215.

In some embodiments the difference in the luminance pattern is calculated based on a derivative of the pixel intensity signal, such as the relative luminance. For example, the image-processing device 120, 160 may calculate a derivative of the relative luminance for the respective image frames. Regions or blocks of pixels may be compared by summing absolute values of gradients of the luminance of the pixels and then compare the sums between the different image frames.

In some embodiments wherein the first exposure value differs from the second exposure value then luminance of pixels of the first image frame 311' is obtained based on luminance of corresponding pixels of the first captured image frame 311 and further based on a ratio of the second exposure value to the first exposure value, and/or luminance of pixels of the second image frame 312' is obtained based on luminance of corresponding pixels of the second captured image frame 312 and further based on the ratio of the second exposure value to the first exposure value.

Thus, in order to detect the difference in the luminance pattern the image-processing device 120, 160 may take into account the ratio of the second exposure value to the first exposure value.

By analysing the difference in the luminance pattern of corresponding pixels of the first image frame and the second image frame captured with the difference in depths of field determination of whether or not the protective cover is partly covered by the foreign object is improved since the images used for the determination are anyway captured such that no extra images nor image stream is necessary.

Different parts of the protective cover 210 will be imaged on different parts of the image sensor 201, 301. Thus, by analyzing differences in the luminance pattern of different parts of the image frames, corresponding to different parts of the image sensor 201, 301, different parts of the protective cover, which are imaged on the image sensor 201, 301, may be scanned for detection of foreign objects. A first pixel 411 of the first captured image frame 311 may be close to an optical axis. The first pixel 411 may then correspond to a part of the protective cover 210 close to the middle of the lens-based optical imaging system 202. Pixels further out on the image sensor 201, 301, such as a second pixel 412 or a third pixel 413, correspond to parts of the protective cover which are further away from the middle of the lens-based optical imaging system 202.

Action 407

The video camera 120 may adjust a direction in which the video camera 120 captures the image frames 311, 312. The direction may for example be adjusted by the motorised pan and tilt arrangement 205. Thus, in some embodiments herein the direction in which the video camera 120 captures the image frames 311, 312 is adjustable by the motorised pan and tilt arrangement 205. By adjusting the direction of the video camera 120 actions 401-406 above may be repeated at multiple orientations of the video camera 120. By adjusting the direction it is possible to analyse and detect multiple areas of the transparent protective cover 210. For example, some parts of the transparent protective cover 210 may be extend outside the field of view 220 of the video camera 120. Then it is also possible to capture a respective pair of image frames at multiple camera orientations, each camera orientation defined by the pan angle and the tilt angle and compare results of the detection analysis from the different camera orientations. Other parameters describing the camera orientation may also be used. Such parameters may for example be given by an accelerometer and a compass arranged in or at the video camera 120.

In order to be able to compare results from the different camera orientations, the captured images frames capture at least partly a same part of the protective cover 210. For example, in order to compare detection results of the object 215 on the protective cover 210 the image frames that are used for the comparison capture an image of the object 215.

Figure 5:
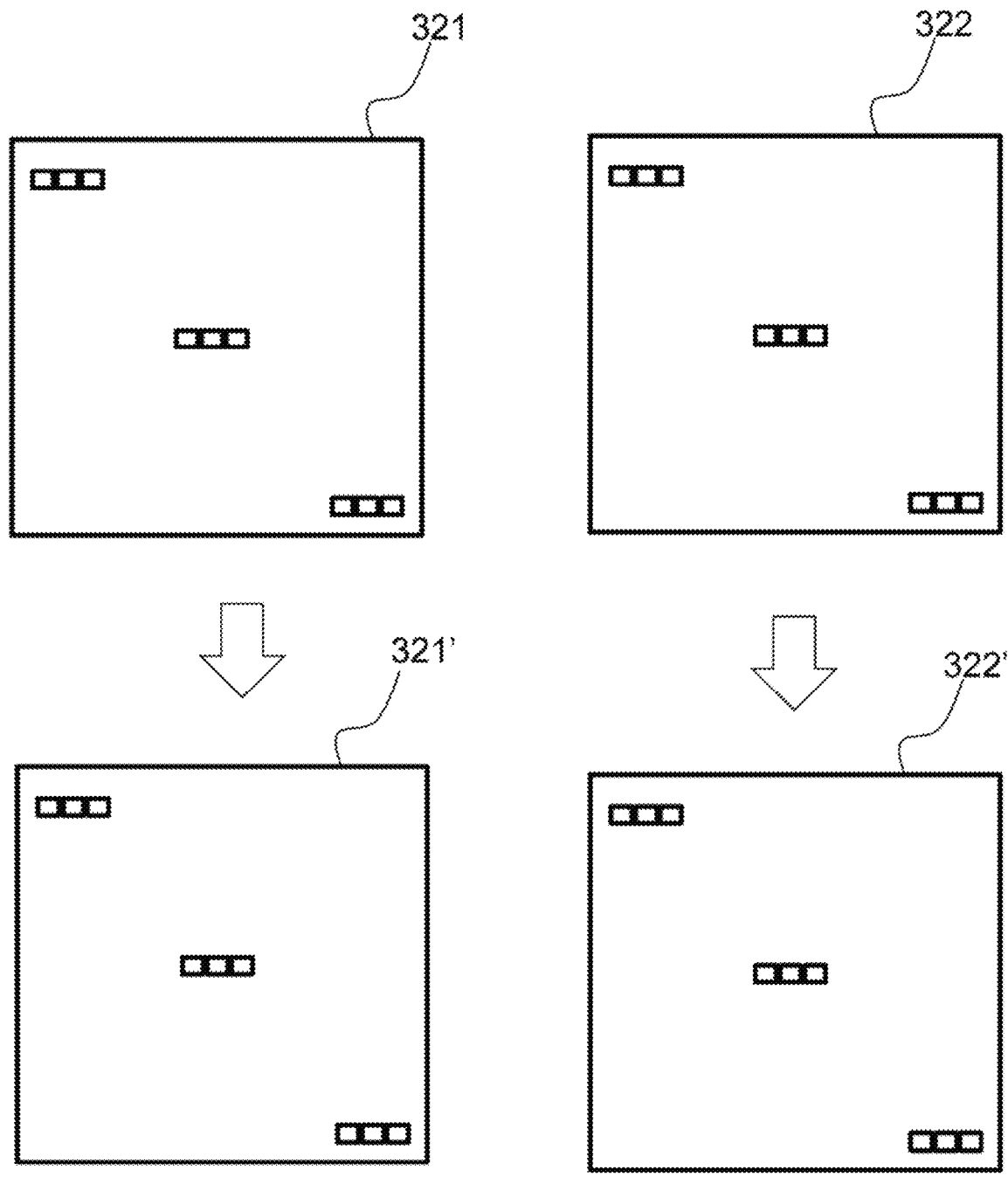
FIG. 5 illustrates further exemplifying embodiments herein.

Such comparisons may corroborate a first result or trigger further analysis. For example, a first analysis at a first camera orientation may indicate that there is an object 215 on the protective cover 210. Then a second analysis at a second camera orientation also indicates that there is an object 215 on the protective cover 210. Then the two analyses corroborate each other, and appropriate actions may be taken as a result. An example of such an action is given below in action 408. FIG. 5 illustrates how a further pair of captured images 321, 321 is transformed into a further pair of images 321', 322' which may be used for detection of objects and comparison with the first pair of images 311', 312'.

Thus, the first and second captured image frames 311, 312 may be captured at a first orientation of the video camera 120. A further first captured image frame 321 and a further second captured image frame 322 may be captured at a second orientation of the video camera 120.

The further first captured image frame 321 is captured with a further first depth of field and the further second captured image frame 322 is captured with a further second depth of field which differs from the further first depth of field.

The first orientation corresponds to first values of pan and tilt of the pan and tilt arrangement 205 and the second orientation corresponds to second values of pan and tilt of the pan and tilt arrangement 205 which at least partly differ from the first values. The image frames captured at the first and the second orientation capture at least partly the same part of the protective cover 210.

In some embodiments herein determining whether or not the protective cover 210 is partly covered by the foreign object 215 is based on an evaluation of the determining at both the first and the second orientation. In other words, detecting the foreign object 215 at the protective cover 210 may be based on an evaluation of the detection at both the first and the second orientation.

For example, the image-processing device 120, 180 may determine whether or not the protective cover 210 is partly covered by the foreign object 215 based on analysing whether or not the first and second captured image frames 311, 312 are affected by presence of the foreign object 215 such that the difference between the first depth of field and the second depth of field results in the difference in the luminance pattern of corresponding pixels of the first image frame 311' and the second image frame 312', and further based on whether or not the further first and further second captured image frames 321, 322 are affected by presence of the foreign object 215 such that the difference between the further first depth of field and the further second depth of field results in a difference in the luminance pattern of corresponding pixels of the further first image frame 321' and the further second image frame 322'.

Action 408

In some embodiments the image-processing device 120, 160 triggers a warning indication in response to determining that the protective cover 210 is partly covered by the foreign object 215. In other words, the image-processing device 120, 160 may trigger the warning indication in response to detecting the foreign object 215.

In some embodiments herein the warning indication is sent to the VMS or as an email to an operator. In some other embodiments herein the warning indication is stored in a memory of the video camera 120. The VMS or the operator may then check for the warning, e.g., once every day.

Figure 6:
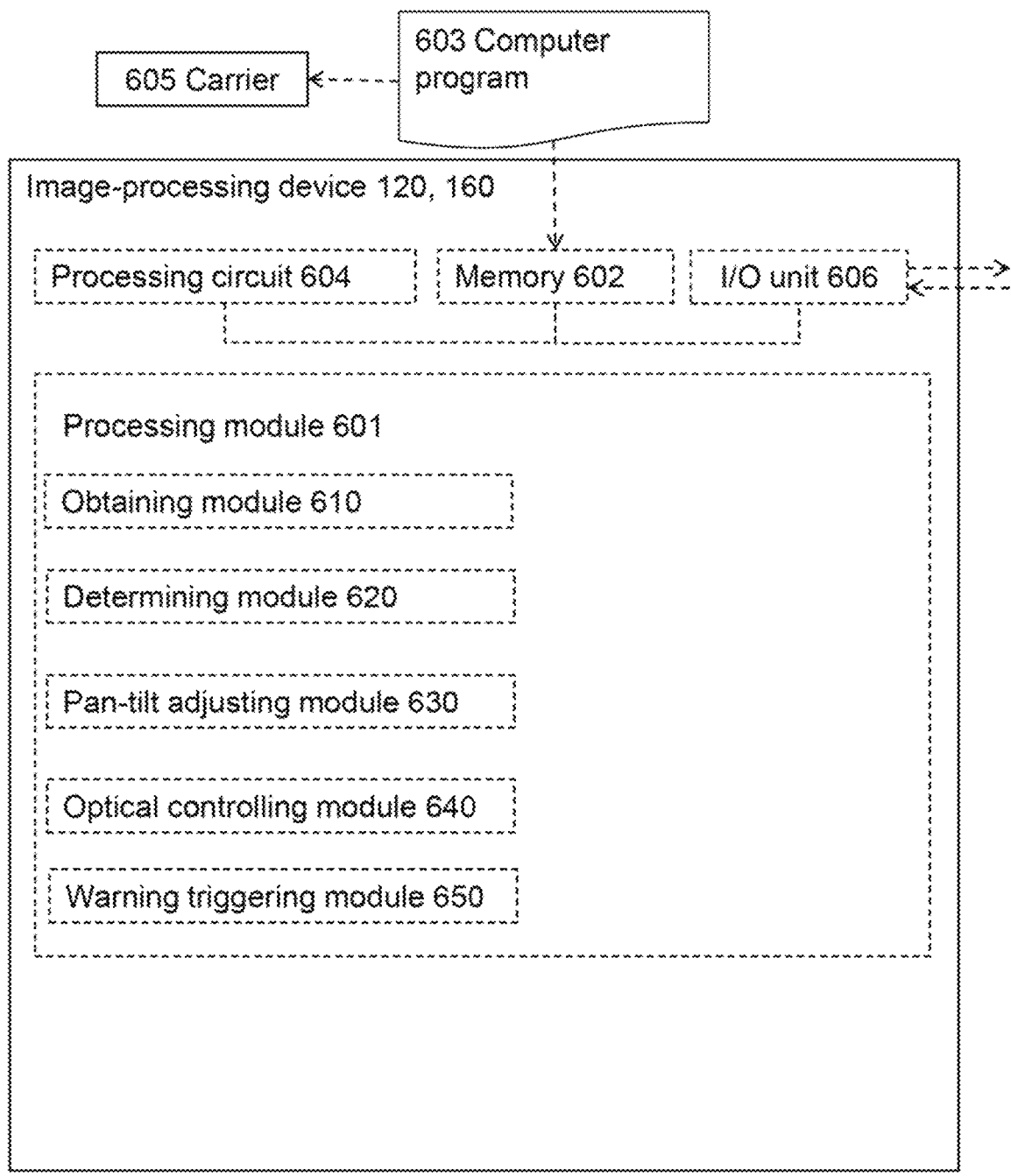
FIG. 6 is a block diagram illustrating embodiments of the image-processing device.

With reference to FIG. 6, a schematic block diagram of embodiments of an image-processing device 120, 160 is shown. The image-processing device 120, 160 is configured to determine whether or not the transparent protective cover 210 of the video camera 120, is partly covered by the foreign object 215.

As mentioned above, in some embodiments herein the image-processing device 120, 160 is the video camera 120. The video camera 120 may be a PTZ video camera. Thus, the image-processing device 120, 160 may be a PTZ video camera.

The image-processing device 120, 160 may comprise a processing module 601, such as a means for performing the methods described herein. The means may be embodied in the form of one or more hardware modules and/or one or more software modules The image-processing device 120, 160 may further comprise a memory 602. The memory may comprise, such as contain or store, instructions, e.g. in the form of a computer program 603, which may comprise computer readable code units which when executed on the image-processing device 120, 160 causes the image-processing device 120, 160 to perform the method of determining whether or not the transparent protective cover 210 of the video camera 120 is partly covered by the foreign object 215. For example, the computer program 603 may be executed on one or more processors, such as a processing circuit 604, of the image-processing device 120, 160 to cause the one or more processors to perform the method of determining whether or not the transparent protective cover 210 of the video camera 120 is partly covered by the foreign object 215.

According to some embodiments herein, the image-processing device 120, 160 and/or the processing module 601 comprises the processing circuit 604 as an exemplifying hardware module, which may comprise one or more processors. Accordingly, the processing module 601 may be embodied in the form of, or 'realized by', the processing circuit 604. The instructions may be executable by the processing circuit 604, whereby the image-processing device 120, 160 is operative to perform the methods of FIG. 4a. As another example, the instructions, when executed by the image-processing device 120, 160 and/or the processing circuit 604, may cause the image-processing device 120, 160 to perform the method according to FIG. 4a.

In view of the above, in one example, there is provided an image-processing device 120, 160 for determining whether or not the transparent protective cover 210 of the video camera 120 is partly covered by the foreign object 215. Again, the memory 602 contains the instructions executable by said processing circuit 604 whereby the image-processing device 120, 160 is operative for performing the method according to FIG. 4a:

The image-processing device 120, 160 may further be operative to perform the methods according to the detailed embodiments described above in connection to FIG. 4a.

FIG. 6 further illustrates a carrier 605, or program carrier, which comprises the computer program 603 described above. The carrier 805 may be one of an electronic signal, an optical signal, a radio signal and a computer readable medium.

In some embodiments, the image-processing device 120, 160 and/or the processing module 601 may comprise one or more of an obtaining module 610, a determining module 620, a pan-tilt adjusting module 630, an optical controlling module 640, a warning triggering module 650, as exemplifying hardware modules. In other examples, one or more of the aforementioned exemplifying hardware modules may be implemented as one or more software modules.

Moreover, the processing module 601 may comprise an Input/Output unit 606. According to an embodiment, the Input/Output unit 606 may comprise the image sensor 201, 301 configured for capturing the image frames described above such as the first captured image frame 311 and the second captured image frame 312.

Accordingly, the image-processing device 120, 160 is configured for determining whether or not the transparent protective cover 210 of the video camera 120 is partly covered by the foreign object 215.

Therefore, according to the various embodiments described above, the image-processing device 120, 160 and/or the processing module 601 and/or the obtaining module 120, 160 is configured to obtain the first captured image frame 311 captured by the video camera 120 with the first depth of field and to obtain the second captured image frame 312 captured by the video camera 120 with the second depth of field which differs from the first depth of field.

In some embodiments the image-processing device 120, 160 and/or the processing module 601 and/or the obtaining module 120, 160 is configured to capture at least partly the same part of the protective cover 210 by the first and second captured image frames 311, 312.

The image-processing device 120, 160 and/or the processing module 601 and/or the determining module 620 is configured to determine whether or not the protective cover 210 is partly covered by the foreign object 215 by analysing whether or not the first and second captured image frames 311, 312 are affected by presence of the foreign object 215 on the protective cover 210 such that the difference between the first depth of field and the second depth of field results in the difference in the luminance pattern of corresponding pixels 411'. 421' of the first image frame 311' and the second image frame 312'. The first image frame 311' is based on the first captured image frame 311 and the second image frame 312' is based on the second captured image frame 312.

In some embodiments herein the focal length of the optical imaging system 202 is adjustable. Then the image-processing device 120, 160 and/or the processing module 601 and/or the obtaining module 610 may be configured to capture the first captured image frame 311 with the first focal length of the optical imaging system 202 to obtain the first depth of field and capture the second captured image frame 312 with the second focal length of the optical imaging system 202 to obtain the second depth of field.

When focal length of the optical imaging system 202 is adjustable and the second focal length differs from the first focal length, then the image-processing device 120, 160 and/or the processing module 601 and/or the obtaining module 610 may be configured to obtain either the first image frame 311' by geometrically transforming the first captured image frame 311, or the second image frame 312' by geometrically transforming the second captured image frame 312.

In some embodiments the optical imaging system 202 of the video camera 120 comprises the adjustable aperture. Then the image-processing device 120, 160 and/or the processing module 601 and/or the obtaining module 610 may be configured to obtain the first depth of field by the first aperture opening of the optical imaging system 202, and the second depth of field by the second aperture opening of the optical imaging system 202.

The image-processing device 120, 160 and/or the processing module 601 and/or the determining module 620 may be configured to determine that the protective cover 210 is partly covered by the foreign object 215, i.e., the foreign object is detected, if the difference in the luminance pattern is above the threshold.

The image-processing device 120, 160 and/or the processing module 601 and/or the determining module 620 may be configured to determine that the protective cover 210 is partly covered by the foreign object 215 if the larger depth of field results in the lower luminance of the luminance pattern than the shallower depth of field.

In some embodiments wherein the first captured image frame 311 is captured with the first exposure value, the second captured image frame 312 is captured with the second exposure value, which differs from the first exposure value. Then the image-processing device 120, 160 and/or the processing module 601 and/or the obtaining module 610 may be configured to obtain luminance of pixels of the first image frame 311' based on luminance of corresponding pixels of the first captured image frame 311 and further based on the ratio of the second exposure value to the first exposure value, and/or luminance of pixels of the second image frame 312' based on luminance of corresponding pixels of the second captured image frame 312 and further based on the ratio of the second exposure value to the first exposure value.

In some embodiments the further first captured image frame 321 and the further second captured image frame 322 are captured at the second orientation of the video camera 120 and the further first captured image frame 321 is captured with the further first depth of field and the further second captured image frame 3222 is captured with the further second depth of field which differs from the further first depth of field. Then the image-processing device 120, 160 and/or the processing module 601 and/or the determining module 620 is configured to determine whether or not the protective cover 210 is partly covered by the foreign object 215 further based on whether or not the further first and further second captured image frames 321, 322 are affected by presence of the foreign object 215 such that the difference between the further first depth of field and the further second depth of field results in the difference in the luminance pattern of corresponding pixels of the further first image frame 321' and the further second image frame 322'.

The image-processing device 120, 160 and/or the processing module 601 and/or the pan-tilt adjusting module 640 may be configured to adjust the motorised pan and tilt arrangement to adjust the direction in which the video camera 120 captures the image frames 311, 312.

The image-processing device 120, 160 and/or the processing module 601 and/or the warning triggering module 650 may be configured to trigger the warning indication in response to determining that the protective cover 210 is partly covered by the foreign object 215.

The image-processing device 120, 160 and/or the processing module 601 and/or the optical controlling module 540 may be configured to control the optical imaging system 202 to obtain the first depth of field and control the optical imaging system 202 to obtain the second depth of field which differs from the first depth of field.

As used herein, the term "module" may refer to one or more functional modules, each of which may be implemented as one or more hardware modules and/or one or more software modules and/or a combined software/hardware module. In some examples, the module may represent a functional unit realized as software and/or hardware.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be an obtaining means, determining means, pan-tilt adjusting means, optical controlling means, warring triggering means or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by an image-processing device, for determining whether or not a transparent protective cover of a video camera comprising a lens-based optical imaging system is partly covered by a foreign object on the protective cover, wherein a focal length of the optical imaging system is adjustable, the method comprising:
    obtaining a first captured image frame captured by the video camera with a first depth of field, wherein the first captured image frame is captured with a first focal length of the optical imaging system to obtain the first depth of field;
    obtaining a second captured image frame captured by the video camera with a second depth of field which differs from the first depth of field, wherein the second captured image frame is captured with a second focal length of the optical imaging system to obtain the second depth of field; and
    determining whether or not the protective cover is partly covered by the foreign object by analysing whether or not the first and second captured image frames are affected by presence of the foreign object on the protective cover such that the difference between the first depth of field and the second depth of field results in a difference in a luminance pattern of corresponding pixels of a first image frame and a second image frame, wherein the first image frame is based on the first captured image frame and the second image frame is based on the second captured image frame;
    wherein the luminance pattern corresponds to a pattern of a gradient of the luminance of the corresponding pixels.

2. The method according to claim 1, wherein the first image frame is obtained by geometrically transforming the first captured image frame, and/or the second image frame is obtained by geometrically transforming the second captured image frame.

3. The method according to claim 1, wherein the optical imaging system of the video camera comprises an adjustable aperture, and wherein the first depth of field is obtained by the first focal length and a first aperture opening of the optical imaging system, and wherein the second depth of field is obtained by the second focal length and a second aperture opening of the optical imaging system.

4. The method according to claim 1, wherein it is determined that the protective cover is partly covered by the foreign object if the difference in the luminance pattern is above a threshold.

5. The method according to claim 1 wherein it is determined that the protective cover is partly covered by the foreign object if a larger depth of field results in a lower luminance of the luminance pattern than a shallower depth of field.

6. The method according to claim 1, wherein the first captured image frame is captured with a first exposure value, the second captured image frame is captured with a second exposure value, which differs from the first exposure value and wherein luminance of pixels of the first image frame is obtained based on luminance of corresponding pixels of the first captured image frame and further based on a ratio of the second exposure value to the first exposure value, and/or luminance of pixels of the second image frame is obtained based on luminance of corresponding pixels of the second captured image frame and further based on the ratio of the second exposure value to the first exposure value.

7. The method according to claim 1, wherein a direction in which the video camera captures the image frames is adjustable by a motorised pan and tilt arrangement, and wherein the first and second captured image frames are captured at a first orientation of the video camera and wherein a further first captured image frame and a further second captured image frame are captured at a second orientation of the video camera, wherein the further first captured image frame is captured with a further first depth of field and the further second captured image frame is captured with a further second depth of field which differs from the further first depth of field, and wherein the first orientation corresponds to first values of pan and tilt of the pan and tilt arrangement and wherein the second orientation corresponds to second values of pan and tilt of the pan and tilt arrangement which at least partly differ from the first values, and wherein the image frames captured at the first and the second orientation capture at least partly a same part of the protective cover, and wherein determining whether or not the protective cover is partly covered by the foreign object is further based on whether or not the further first and further second captured image frames are affected by presence of the foreign object such that the difference between the further first depth of field and the further second depth of field results in a difference in the luminance pattern of corresponding pixels of the further first image frame and the further second image frame.

8. The method according to claim 1, further comprising:
triggering a warning indication in response to determining that the protective cover is partly covered by the foreign object.

9. The method according to claim 1, wherein at least partly a same part of the protective cover is captured by the first and second captured image frames.

10. An image-processing device configured to perform the method according to claim 1.

11. The image-processing device according to claim 10, wherein the image-processing device is the video camera.

12. The image-processing device according to claim 10, wherein the video camera is a PTZ video camera.

13. A non-transitory storage device having stored therein a computer program, comprising computer readable code units which when executed on an image-processing device causes the image-processing device to perform the method according to claim 1.

14. The non-transitory storage device of claim 13, wherein the first image frame is obtained by geometrically transforming the first captured image frame, and/or the second image frame is obtained by geometrically transforming the second captured image frame.

15. The non-transitory storage device of claim 13, wherein the optical imaging system of the video camera comprises an adjustable aperture, and wherein the first depth of field is obtained by the first focal length and a first aperture opening of the optical imaging system, and wherein the second depth of field is obtained by the second focal length and a second aperture opening of the optical imaging system.

16. The non-transitory storage device of claim 13, wherein it is determined that the protective cover is partly covered by the foreign object if the difference in the luminance pattern is above a threshold.

17. The non-transitory storage device of claim 13, wherein it is determined that the protective cover is partly covered by the foreign object if a larger depth of field results in a lower luminance of the luminance pattern than a shallower depth of field.

18. The non-transitory storage device of claim 13, wherein the first captured image frame is captured with a first exposure value, the second captured image frame is captured with a second exposure value, which differs from the first exposure value and wherein luminance of pixels of the first image frame is obtained based on luminance of corresponding pixels of the first captured image frame and further based on a ratio of the second exposure value to the first exposure value, and/or luminance of pixels of the second image frame is obtained based on luminance of corresponding pixels of the second captured image frame and further based on the ratio of the second exposure value to the first exposure value.

19. The non-transitory storage device of claim 13, wherein a direction in which the video camera captures the image frames is adjustable by a motorised pan and tilt arrangement, and wherein the first and second captured image frames are captured at a first orientation of the video camera and wherein a further first captured image frame and a further second captured image frame are captured at a second orientation of the video camera, wherein the further first captured image frame is captured with a further first depth of field and the further second captured image frame is captured with a further second depth of field which differs from the further first depth of field, and wherein the first orientation corresponds to first values of pan and tilt of the pan and tilt arrangement and wherein the second orientation corresponds to second values of pan and tilt of the pan and tilt arrangement which at least partly differ from the first values, and wherein the image frames captured at the first and the second orientation capture at least partly a same part of the protective cover, and wherein determining whether or not the protective cover is partly covered by the foreign object is further based on whether or not the further first and further second captured image frames are affected by presence of the foreign object such that the difference between the further first depth of field and the further second depth of field results in a difference in the luminance pattern of corresponding pixels of the further first image frame and the further second image frame.

20. The non-transitory storage device of claim 13, wherein the method further comprising:
triggering a warning indication in response to determining that the protective cover is partly covered by the foreign object.

21. The method according to claim 1, wherein the luminance of the corresponding pixels is a relative luminance of the corresponding pixels.

* * * * *